Nov. 8, 1966  HIROSUKE YUMOTO ET AL  3,284,551
STRETCHING PROCESS OF THERMO-PLASTIC FILM
Filed April 30, 1963

INVENTORS
Hirosuke Yumoto
Kazuya Harada
Masaaki Itoga
By Stevens, Davis, Miller & Mosher
Attorneys 3,284,551
STRETCHING PROCESS OF THERMO-PLASTIC FILM
Hirosuke Yumoto, Kazuya Harada, and Masaaki Itoga, all of Mishima-shi, Shizuoka-ken, Japan, assignors to Toyo Rayon Kabushiki Kaisha, Tokyo, Japan, a corporation of Japan
Filed Apr. 30, 1963, Ser. No. 276,703
Claims priority, application Japan, May 10, 1962, 37/23,156
7 Claims. (Cl. 264—25)

The present invention is aimed at improving the mechanical characteristics of a thermo-plastic film by stretching it and, thus, causing molecular orientation. Particularly, the invention is characterized in that when stretching such a film it is first preliminarily heated uniformly across the whole breadth, to a temperature within the range from 70° C. to the melting point, and necking (constriction) is formed at one or two spots in the transverse direction by local heating to a temperature higher than the other areas, and then the film is heated (for stretching).

Further, it is characterized in that preliminary stretching in the breadth direction of less than 1.7 times is done by such preliminary heating of the film.

The present invention is aimed at fixing the necking (constriction) caused at the start of stretching on a spot nearby the forwardmost position of the stretch zone by heating locally during the preliminary heating.

Another object of the invention is to perform stretching without any uneven thickness by effectively fixing the necking (constriction) by performing preliminary stretching of less than 1.7 times the original breadth up to the terminal point by the local heating during the preliminary heating.

The inventors have proposed in a previous application, Serial No. 178,865, filed March 12, 1962, that when continuously stretching a film of crystalline polyolefin in the transverse direction, a process whereby restricted parts of the film are subjected to local heating diagonal to the forward direction of the film. The whole film is gradually stretched by adjusting the heat source so as to cause stretching only at the boundary zone between the stretched portion and the un-stretched portion of the film. This process can be performed by a stretching apparatus of a type whereby, for example, a film to be stretched is uniformly heated by hot air and, at the same time, is subjected to the local diagonal heating.

In such process, however, when, for instance, a uniformly oriented film is obtained by stretching a crystalline polyolefin in the transverse direction, it often occurs during the initial stage of the stretching that it is difficult to fix the stretch point of the film at the spot of the forwardmost part of the stretch heating zone, thus such spot is left almost un-stretched, damaging the uniformity of the stretch.

Detailed observations were made on the condition of the film in the initial stage of stretching for the purpose of studying the cause, and it was found that no obvious stretch was observed on the spot of the initial local heating for the stretch heating zone and the necking (constriction took place in other spots which are slightly behind such terminal position.

Figure 1:
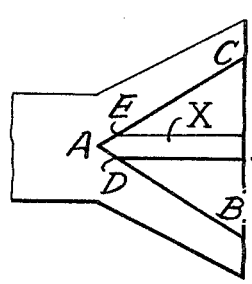
FIG. 1 is a plan view showing the state of stretched film and the arrangement of heaters in accordance with the prior stretching process.

As shown in FIG. 1, when film moving in the direction of the arrow is stretched in the transverse direction by heaters arranged along lines AB and AC, necking (constriction) takes place roughly along AB and AC. However, between AD and AE, no necking (constriction) occurs and without being stretched, there remains a streak X. A similar result is obtained even when the film up to point A is sufficiently pre-heated.

Figure 2:
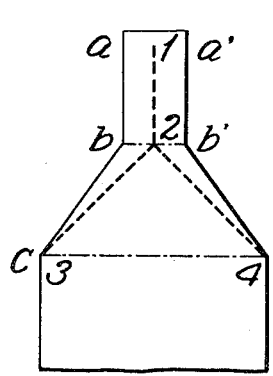

With respect to the present invention, FIG. 2 is a plan view showing a state of film being stretched and an arrangement of heaters. The zone $a$, $a'$–$b$, $b'$ is the pre-heating section, where an infra-red ray heater 1–2 is provided for local heating. The zone $b$, $b'$–$c$, $c'$ is the transverse stretching section where infra-red ray heaters 2–3 and 2–4 are provided for stretching the film in the stretching zone in a reverse V-shape across the direction of movement of the film.

Figure 3:
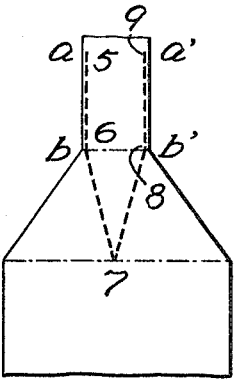

In FIG. 3, two infra-red ray heaters 5–6 and 9–8 are provided to effect local heating in the pre-heating section, and infra-red ray heaters 6–7 and 8–7 are arranged in V-shape to provide heating of the film in the stretching zone.

Figure 4:
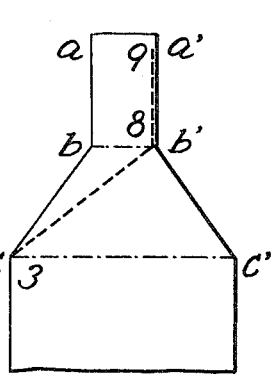
Figure 5:
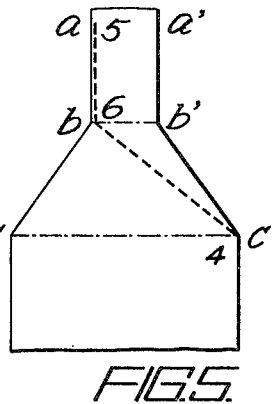

In FIG. 4 and FIG. 5, respectively, infra-red ray heaters 9–8 and 5–6 are provided to effect local heating on one side edge of the film in the preheating section, and infra-red ray heaters 8–3 and 6–4 are provided to effect the heating of the film in the stretching zone thereby forming a J-shape or reverse J-shape arrangement. By the heater arrangements above described, one or more heaters are provided in the preheating section parallel with the direction of travel of the film, and the terminal of said heater or heaters is connected with the forwardmost end of the heater or heaters in the stretching zone.

Figure 6:
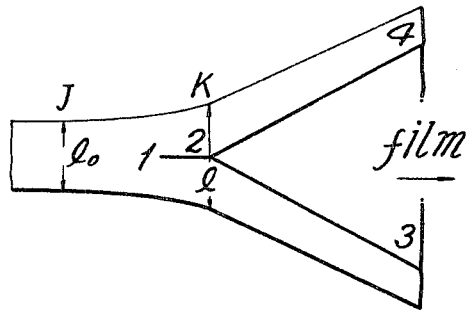
FIGS. 2, 3, 4, 5 and 6 are plan views showing the state of stretched films and the arrangement of heaters according to the process of the present invention.

Referring to FIG. 1, by slightly stretching the film until it reaches point A, the necking (constriction) starting point, i.e. points D and E come gradually close to point A and, finally, coincides with point A. In such case, there remains no unstretched portion. In order to practice this effect with good reproducibility the film is stretched to not more than 1.7 times its original size between lines J and K as shown in FIG. 6 while keeping the whole film at a pre-heating temperature between 70° C. and its melting point and, in the latter portion of the pre-heating section, an infra-red ray heater 1–2 is provided for local heating which effects a temperature particularly higher than other areas. Thus, the stretch-starting point (necking (constriction)) is formed in the film along the heater 1–2. Thereafter, necking (constriction) takes place along the heaters 2–3 and 2–4 for stretching. Meanwhile, every part in the transverse direction is uniformly stretched.

By using the above-described heater arrangement of FIG. 6 and keeping the surrounding temperature at 120° C., an isotactic polypropylene film of 0.1 mm. thickness stretched to 3.75 times its original size in the longitudinal direction was gradually stretched to about 6 times its original dimension in the transverse direction by an infra-red ray heater having a heating capacity of 5 kw./m.

Figure 7:
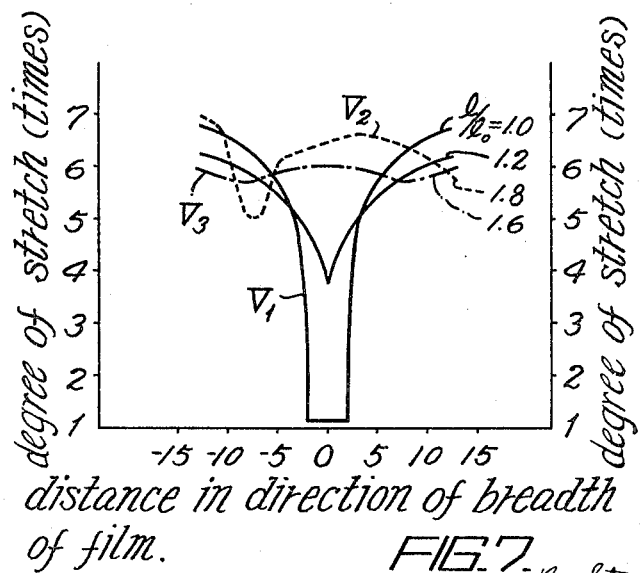
FIG. 7 is a graph showing the relationship between the distance in the transverse direction of film and the degree of stretch.

Then, the stretch degree of the film until it reached the forwardmost position of the stretching zone, i.e., $1/1_0$ in FIG. 6, was selected at various values. Before stretching, multiple square-framed marks of 1 cm. grid were formed on the film. After stretching, the distribution of the stretch rate was examined from the expansion of the grids, and the results obtained are as shown in FIG. 7.

At $1/1_0 = 1.0$, an unstretched belt was noticed in the middle of film as the curve $V_1$.

As $1/1_0$ increased, the stretch degree of this portion gradually increases.

At $1/1_0 = 1.6$, the stretch degree is about 6 times, is represented by the curve $V_3$, and a uniformly stretched film was obtained.

At $1/1_0 = 1.8$, it became uneven again as illustrated by the curve $V_2$.

The proper value of $1/1_0$ varies according to the kind of film. With the same film, it differs according to stretch temperature, and stretch speed, etc. However, it is approximately within the range of 1.7. In selecting the proper value for $1/1_0$, the yield point of the film shall be referred to, and the $1/1_0$ should be adjusted according to changes in the yield point.

For uniformly heating the whole breadth of the film in the initial stage of stretching, the preliminary heating temperature shall preferably be over 70° C. At lower temperatures, a large amount of force is necessary for stretching and, consequently, there will be heavy wear of the apparatus. In addition, a film which has been stretched beforehand in the longitudinal direction is apt to split in this direction making smooth stretching impossible. At temperatures higher than the melting point, the film is softened so remarkably that it loses its self-supporting nature. Further, it does not undergo molecular orientation and, of course, it is impossible to form partial constriction by the process of the present invention.

The local heating which is performed in the latter portion of the preheating section and the constriction which takes place therein is limited to one or two spots throughout the whole breadth of the film.

If more constrictions are formed, uniform stretch will not result in the subsequent stretching step. Thus, uniformly stretched film will not be obtained.

In the present invention, the temperature of the local heating would suffice if it is, as a matter of principle, slightly higher than the temperature of the other areas under the preliminary heat. In order to ensure constriction in the local heating position, however, it is necessary to take into consideration the uneven thickness of film and keep the temperature at least 10° C. higher.

This invention can be utilized for all thermo-plastic films of the type which are stretched causing constriction and, particularly, isotactic polypropylene and polyamide films.

The invention will be more fully illustrated by the following examples:

*Example 1*

Polypropylene having an intrinsic viscosity of 2.6 in tetralin at 135° C. and having 98% isotacticity by ether and n-heptane extraction process was melt-extruded, and cooled. A film 500 mm. wide and 100 microns thick which has been longitudinally stretched into 4 times its original length was stretched transversely 4 times its original breadth using an apparatus in which the heaters were arranged as shown in FIG. 2, and a biaxially stretched film 2000 mm. wide and 25 microns thick was obtained. The heater 1–2 had a capacity of 5 kw./m., and heaters 2–3 and 2–4 had capacities of 12 kw./m. and 5 kw./m., respectively.

The radiation breadth of the film (i.e. the breadth within the 1/2 intensity of the maximum radiation intensity) was made 55 mm. for heater 1–2. The heaters 2–3 and 2–4 had an average radiation breadth of 50 mm. The radiation breadth at the end identified as 2 was larger, and those at 3 and 4 were smaller so as to make the variation 50%. A water-cooling slit was equipped underneath the infra-red ray heaters to adjust them.

Film was preliminarily heated by subjecting it to hot air heated to a 120° C. average temperature within the portion after line $a\text{–}a'$ and in front of the heaters 2–3 and 2–4 excepting the portion under local heating by heater 1–2. The thickness unevenness of the film was compared with and without utilizing the heater 1–2, and the results are presented below.

|  | With heater 1–2 | Without heater 1–2 |
|---|---|---|
| Transverse thickness uneveness, percent | 9 | 58 |

*Example 2*

From the same starting material as in Example 1, a film 500 mm. wide and 100μ thick was stretched to 4.5 times its original length. The film was stretched transversely to 4 times its original size by an apparatus utilizing infra-red ray heaters arranged as shown in FIG. 3, and a biaxially stretched film of 2000 mm. breadth and 25μ thickness was obtained. The capacity of heaters 5–6 and 9–8 was 5 kw./m., and that of 6–7 and 8–7 was 12.5 kw./m. The radiation breadth was the same as in Example 1. The preheating temperature used was 120° C.

The transverse thickness unevenness was about 30% except for the grip parts of the edges.

*Example 3*

Similar polypropylene film as that of Example 1 was stretched by an infra-red ray heater arrangement as shown in FIG. 4. The capacity of the heater 8–3 was 20 kw./m. and the heater 9–8 was 5 kw./m. A film having an average unevenness thickness in the transverse direction of 20% was obtained.

*Example 4*

A polypropylene film having a residue content of 94% when extracted by ether and n-hepthane, an intrinsic viscosity of 2.0 in tetralin solution at 135° C., and a 0.15 mm. thickness was fed into a stretching apparatus in which the heaters were arranged as shown in FIG. 6.

Keeping the film at a uniform pre-heating temperature of 120° C. and with the infra-red ray heater 1–2 in the drawing having a capacity of 5 kw./m., the film was preliminarily stretched in the transverse direction between J and K to 1.5 times its original size. Then it was gradually stretched to 6 times throughout the whole breadth while adjusting the infra-red ray heaters 2–3 and 2–4 so as to produce stretching only at the boundary area between the stretched and unstretched portions of the film.

The film was uniformly stretched throughout the whole breadth. The unevenness of thickness, haze, tensile strength, elongation in the stretching direction, and the tear strength of the film thus obtained and having a thickness of 25 microns are as follows:

Unevenness of thickness (percent) _____ 15
Tensile strength (kg./cm.$^2$) _____ 21
Tear strength [a] (g./mil.) _____ 15
Haze [b] (percent) _____ 4.5

N.B. [a] Elemendorf Tester was used. [b] ASTM D–1003–52.

*Example 5*

Polycapramide film of 80 micron thickness previously stretched to 3 times its length in the longitudinal direction and having an intrinsic viscosity of 1.8 in cresol solution was stretched to 1.6 times its original breadth by an apparatus utilizing an arrangement of heaters as shown in FIG. 6. The pre-heating temperature was kept at 140° C., and the infra-red ray heater 1–2 had a capacity of 5 kw./m.

Then, it was gradually stretched to 4.1 times throughout the whole breadth under same conditions as in Example 4. The strength and elongation of the film thus obtained were as follows:

|  | Longitudinal direction | Transverse direction |
|---|---|---|
| Uneven thickness of transverse direction (percent) |  | 13 |
| Tentile strength (kg./cm.$^2$) | 16 | 23 |
| Tensile elongation (percent) | 120 | 50 |

We claim:
1. A process for transversely stretching a polypropylene film which is characterized by necking when stretched, which comprises exerting opposing forces on the opposite transverse edges of the film and moving the film longitudinally through first a preheating zone having a preheating temperature between 70° C. and the film melting point and having localized heating parallel to the longitudinal direction of film movement at a temperature more than 10° C. greater than said preheating temperature, said film being transversely stretched about 1.7 times its original size in said pre-heating zone and second a stretch heating zone diagonal to the longitudinal direction of film movement wherein stretching of the film in the transverse direction is completed, said localized heating in the preheating zone having a rearwardmost point which meets a forwardmost point of the stretch heating zone.

2. The process according to claim 1 in which said localized heating in the preheating zone is concentrated at no more than two positions across the breadth of the film.

3. In a process for transversely stretching a moving polypropylene film by subjecting a portion of the film to a localized heating diagonal to the longitudinal direction of film movement, after preheating to a temperature between 70° C. and the film melting point, said film being characterized by necking when stretched, the improvement which comprises locally super-heating a portion of the film during the preheating at least 10° C. greater than the preheating temperature, which portion is parallel to the longitudinal direction of film movement and has a rearwardmost point which meets a forwardmost point of said portion of the film subjected to diagonal localized heating, and transversely stretching during the preheating to about 1.7 times original film size.

4. The process according to claim 3 in which the portion of the film subjected to local super-heating during preheating is approximately centered transversely on the film and the portion of the film subjected to the diagonal lacalized heating for stretching is in the form of a reverse V-shape, the vertex of which meets the rearwardmost point of the portion of the film subjected to the local super-heating during pre-heating.

5. In a process for transversely stretching a moving film by subjecting a portion of the film after a preheating to a localized heating diagonal to the longitudinal direction of film movement, which film is characterized by necking when stretched, the improvement which comprises locally super-heating a portion of the film during the preheating which portion is parallel to the longitudinal direction of film movement and has a rearwardmost point which meets a forwardmost point of said portion of the film subjected to diagonal localized heating, said portion of the film subjected to the local super-heating during preheating is positioned near both edges of the film and the portion of the film subjected to the localized heating for stretching is in the form of a V-shape, the ends of which meet the rearwardmost portions of the film subjected to local super-heating at both edges of the film.

6. In a process for transversely stretching a moving film by subjecting a portion of the film after a preheating to a localized heating diagonal to the longitudinal direction of film movement, which film is characterized by necking when stretched, the improvement which comprises locally super-heating a portion of the film during the preheating which portion is parallel to the longitudinal direction of film movement and has a rearwardmost point which meets a forwardmost point of said portion of the film subjected to diagonal localized heating, said portion of the film subjected to local super-heating during preheating is near one transverse edge of the film and the portion of the film subjected to localized heating for stretching extends substantially across the whole breadth of the film, the forwardmost portion of which meets the rearwardmost portion of the film subjected to local super-heating.

7. The process according to claim 3, wherein both the local super-heating and the localized heating for stretching of the film are produced by means of infra-red ray heaters.

References Cited by the Examiner

UNITED STATES PATENTS

| 2,334,022 | 11/1943 | Minich | 264—288 |
| 2,854,697 | 10/1958 | Ryan | 264—288 |

FOREIGN PATENTS

| 544,279 | 7/1957 | Canada. |
| 887,346 | 1/1962 | Great Britain. |

ROBERT F. WHITE, *Primary Examiner.*

ALEXANDER H. BRODMERKEL, *Examiner.*

F. S. WHISENHUNT, *Assistant Examiner.*